(12) United States Patent
Kloper et al.

(10) Patent No.: US 10,306,675 B2
(45) Date of Patent: May 28, 2019

(54) COLLISION DETECTION AND AVOIDANCE MECHANISM USING DISTRIBUTED RADIO HEADS IN A WIRELESS NETWORK

(71) Applicant: Cisco Technology, Inc., San Jose, CA (US)

(72) Inventors: David Kloper, Santa Clara, CA (US); Brian D. Hart, Sunnyvale, CA (US); Matthew A. Silverman, Shaker Heights, OH (US); Paul J. Stager, Akron, OH (US)

(73) Assignee: Cisco Technology, Inc., San Jose, CA (US)

( * ) Notice: Subject to any disclaimer, the term of this patent is extended or adjusted under 35 U.S.C. 154(b) by 64 days.

(21) Appl. No.: 15/585,400

(22) Filed: May 3, 2017

(65) Prior Publication Data

US 2018/0324858 A1 Nov. 8, 2018

(51) Int. Cl.
*H04W 74/08* (2009.01)
*H04W 74/00* (2009.01)
(Continued)

(52) U.S. Cl.
CPC ....... *H04W 74/0816* (2013.01); *H04L 1/0002* (2013.01); *H04L 1/0007* (2013.01);
(Continued)

(58) Field of Classification Search
CPC ............. H04W 74/004; H04W 74/006; H04W 74/0816; H04B 7/14; H04B 7/26
See application file for complete search history.

(56) References Cited

U.S. PATENT DOCUMENTS

| 5,425,000 A | 6/1995 | Reed et al. |
| 7,522,669 B2 | 4/2009 | Husted et al. |

(Continued)

OTHER PUBLICATIONS

Bejarano et al., "Scaling Multi-User MIMO WLANs: The Case for Concurrent Uplink Control Messages", IEEE International Conference on Sensing, Communication, and Networking, Jun. 22-25, 2015, 9 pages.

(Continued)

*Primary Examiner* — Wei Zhao
(74) *Attorney, Agent, or Firm* — Edell, Shapiro & Finnan, LLC

(57) ABSTRACT

A central processor subsystem controls multiple transceivers. Each transceiver transmits protocol data units from antennas of that transceiver and produces receive waveforms from wirelessly received signals at the one or more antennas. A transmit waveform, including a frame addressed to one or more wireless client devices, is sent through a first transceiver to be transmitted wirelessly by the first transceiver on a frequency channel. A receive waveform, representative of the transmission by the first transceiver and wirelessly received at a second transceiver, is received from the second transceiver. While the transmit waveform is being sent to the first transceiver: a level of collision between the receive waveform and another transmission on the frequency channel is detected; and if the level of collision exceeds a threshold prior to an end of the receive waveform, the transmit waveform being sent to the first transceiver is modified to reduce the collision.

20 Claims, 7 Drawing Sheets

(51) Int. Cl.
*H04L 1/00* (2006.01)
*H04W 88/08* (2009.01)

(52) U.S. Cl.
CPC ....... *H04W 74/004* (2013.01); *H04W 74/006* (2013.01); *H04L 2001/0092* (2013.01); *H04W 88/085* (2013.01)

(56) References Cited

U.S. PATENT DOCUMENTS

| | | | |
|---|---|---|---|
| 7,720,509 B2 * | 5/2010 | Famolari | H04W 16/28 |
| | | | 343/893 |
| 7,945,005 B2 | 5/2011 | Le Saux et al. | |
| 8,391,374 B2 | 3/2013 | Husted et al. | |
| 8,676,144 B2 | 3/2014 | Guo et al. | |
| 8,842,606 B2 | 9/2014 | Denleneer et al. | |
| 8,885,453 B2 | 11/2014 | Stager | |
| 9,241,275 B2 | 1/2016 | Kloper et al. | |
| 2001/0033579 A1 * | 10/2001 | Nelson, Jr. | H04L 1/1607 |
| | | | 370/447 |
| 2005/0053037 A1 | 3/2005 | Ginzburg et al. | |
| 2007/0133459 A1 | 6/2007 | Kim et al. | |
| 2007/0230403 A1 | 10/2007 | Douglas et al. | |
| 2008/0080631 A1 | 4/2008 | Forenza et al. | |
| 2008/0118004 A1 | 5/2008 | Forenza et al. | |
| 2008/0130790 A1 | 6/2008 | Forenza et al. | |
| 2009/0067402 A1 | 3/2009 | Forenza et al. | |
| 2010/0172309 A1 | 7/2010 | Forenza et al. | |
| 2010/0316163 A1 | 12/2010 | Forenza et al. | |
| 2011/0002371 A1 | 1/2011 | Forenza et al. | |
| 2011/0002410 A1 | 1/2011 | Forenza et al. | |
| 2011/0002411 A1 | 1/2011 | Forenza et al. | |
| 2011/0003606 A1 | 1/2011 | Forenza et al. | |
| 2011/0003607 A1 | 1/2011 | Forenza et al. | |
| 2011/0003608 A1 | 1/2011 | Forenza et al. | |
| 2011/0044193 A1 | 2/2011 | Forenza et al. | |
| 2011/0149882 A1 | 6/2011 | Gong et al. | |
| 2011/0222460 A1 | 9/2011 | Fahldieck | |
| 2012/0087430 A1 | 4/2012 | Forenza et al. | |
| 2012/0093078 A1 | 4/2012 | Perlman et al. | |
| 2012/0314570 A1 | 12/2012 | Forenza et al. | |
| 2013/0034130 A1 | 2/2013 | Forenza et al. | |
| 2013/0039168 A1 | 2/2013 | Forenza et al. | |
| 2013/0170435 A1 * | 7/2013 | Dinan | H04L 45/50 |
| | | | 370/328 |
| 2013/0301471 A1 | 11/2013 | Brown et al. | |
| 2014/0071955 A1 | 3/2014 | Du et al. | |
| 2014/0241240 A1 | 8/2014 | Kloper et al. | |
| 2016/0345258 A1 | 11/2016 | Zhou et al. | |

OTHER PUBLICATIONS

Favalli et al., "Frequency Domain Estimation and Compensation of Intercarrier Interference in OFDM Systems", Spread Spectrum Techniques and Applications, ISSSTA '08. IEEE 10th International Symposium on, Sep. 2008 pp. 470-474, 5 pages.

Balan, et al., "AirSync: Enabling Distributed Multiuser MIMO with Full Spatial Multiplexing," IEEE/ACM Transactions on Networking, Jul. 2012, pp. 1-15.

Balan, et al., "Distributed Multiuser MIMO with Full Spatial Multiplexing," Ming Hsieh Institute, Mar. 12, 2012, pp. 1-2.

Murakami, et al., "Performance Evaluation of Distributed Multi-cell Beamforming for MU-MIMO Systems," 8th International Symposium on Wireless Communication Systems, 2011, pp. 547-551.

International Search Report and Written Opinion in corresponding International Application No. PCT/US2018/028996, dated Aug. 1, 2018, 10 pages.

* cited by examiner

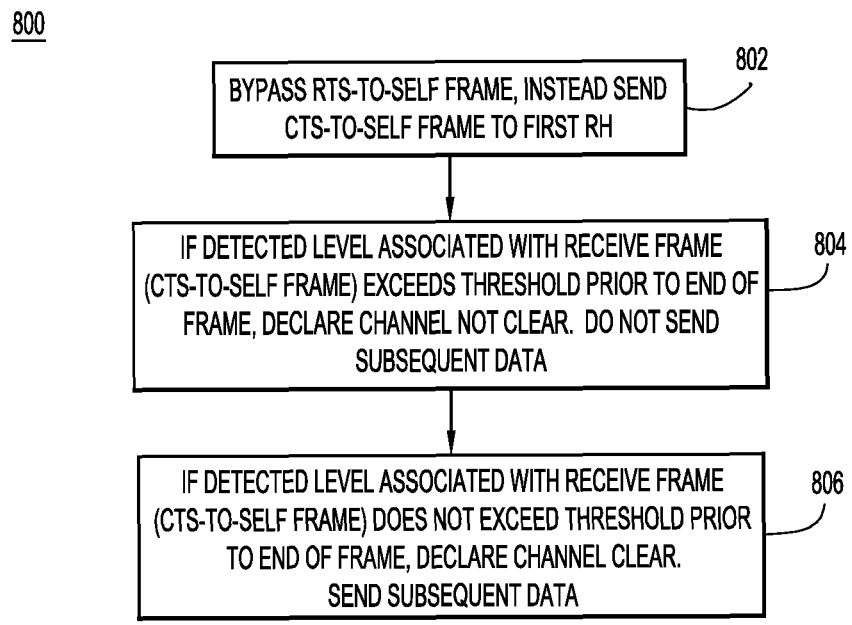

COLLISION DETECTION AND AVOIDANCE MECHANISM USING DISTRIBUTED RADIO HEADS IN A WIRELESS NETWORK

TECHNICAL FIELD

The present disclosure relates to collision detection and avoidance in wireless communications.

BACKGROUND

In a Carrier Sense Multiple Access/Collision Avoidance (CSMA/CA) wireless communication system or network, such as an IEEE 802.11 wireless local area network, co-channel frame collisions are inevitable. To maximize throughput, a receiver of a wireless device (e.g., an access point or a client device) needs to successfully decode one of the frames in the collision. Conventional collision avoidance strategies require an exchange of wireless messages between different devices, such as an access point and a client device, in accordance with a protocol, such as a wireless request-to-send (RTS)/clear-to-send (CTS) protocol. The time required to complete the RTS/CTS protocol exchange wastes air time that could otherwise be used to transmit useful data. Another conventional collision avoidance strategy requires client devices to listen to beacon transmissions conveying transmit window opportunities transmitted from access points, which also wastes air time.

BRIEF DESCRIPTION OF THE DRAWINGS

FIG. 8 is a flowchart of operations expanding on operations performed in the method of FIG. 5, in which a modified RTS/CTS protocol is used, according to an example embodiment.

FIG. 9 is a flowchart of a method combining the operations of the method of FIG. 5 with digital beamforming operations.

DESCRIPTION OF EXAMPLE EMBODIMENTS

Overview

A central processor subsystem is configured to control multiple transceivers separated from each other in a coverage region of a wireless network. Each transceiver is configured to transmit protocol data units (PDUs) wirelessly from one or more antennas of that transceiver and convert wirelessly received signals at the one or more antennas to receive waveforms. A transmit waveform representative of a PDU, including a frame addressed to one or more wireless client devices, is sent through a first transceiver of the multiple transceivers to be transmitted wirelessly by the first transceiver on a frequency channel. A receive waveform, representative of the PDU transmitted by the first transceiver and wirelessly received at a second transceiver of the multiple transceivers that is tuned to receive on the frequency channel, is received from the second transceiver. While the transmit waveform is being sent to the first transceiver: beginning with a start of the receive waveform, a level of collision between the receive waveform and another transmission on the frequency channel is detected; and if the level of collision exceeds a threshold prior to an end of the receive waveform, the transmit waveform being sent to the first transceiver, or a sequence of transmit waveforms representative of PDUs to be sent, is modified to reduce or avoid the collision.

EXAMPLE EMBODIMENTS

Figure 1:
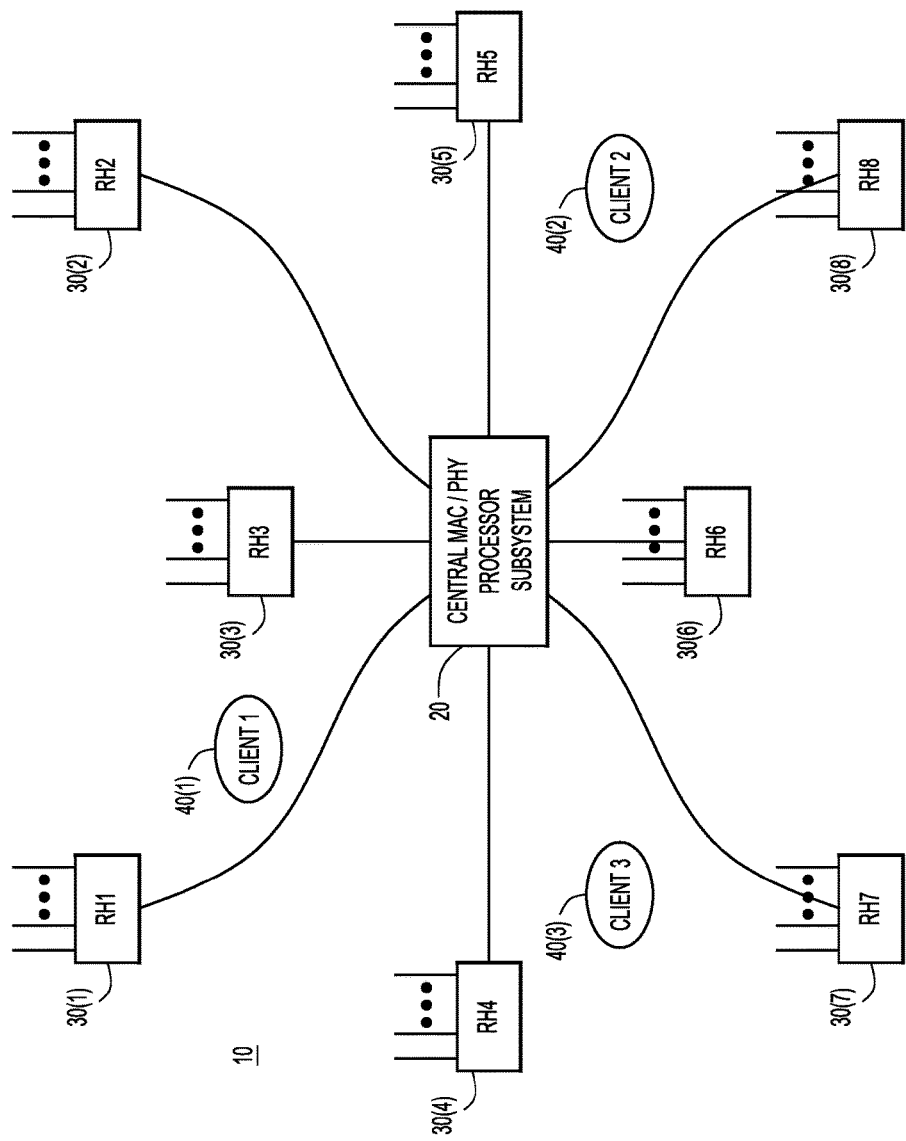
FIG. 1 is a block diagram of distributed multi-user multiple-input multiple-output (MU-MIMO) system using distributed radio heads to implement collision detection and avoidance techniques, according to an example embodiment.

With reference made to FIG. 1, a wireless network system 10 is shown that includes a central media access control/PHY processor subsystem 20 connected to or in communication with a plurality of radio heads (RHs) 30(1)-30(8) (collectively referred to as RHs 30) physically separated from each other across a geographical region and arranged to wirelessly communicate with each other and one or more wireless client devices, e.g., clients 40(1)-40(3), deployed in one or more wireless networks in the geographical region. The RHs are also referred to more generically as "receiver/transmitter devices" or simply "transceivers." While FIG. 1 shows 8 RHs and 3 clients, this is only an example and the numbers of RHs and clients may be different in an actual wireless network deployment.

As described in more detail hereinafter in connection with FIG. 1, each RH includes multiple antennas, a downconverter for each antenna, an upconverter for each antenna, an automatic gain control circuitry/functionality. As a result, each RH can (i) generate multiple receive signals, one detected/received by each antenna, associated with a wireless transmission made by a client device or another RH, and (ii) transmit multiple signals wirelessly, one from each antenna.

With the central MAC/PHY processor subsystem 20 and distributed RHs 30, the ability to receive all of a protocol data unit (PDU) that collides (overlaps in time) with another transmission is greatly improved due to physical separation of the RHs and the large variation in path loss that results. The RHs serve only to detect the start of a PDU, e.g., an 802.11 physical layer convergence procedure (PLCP) PDU (PPDU), perform automatic gain control (AGC) to the PDU, and downconvert the received PDU to baseband (or other intermediate frequency) to produce fixed-point in-phase/quadrature (I/Q) samples (referred to as a receive waveform) representing the PDU. The I/Q samples (i.e., receive waveform) associated with each PDU detected by each antenna of a RH are sent over a fronthaul network to the central MAC/PHY processor subsystem 10. In addition, RHs share a clock and are RF synchronized. The combination of the central MAC/PHY processor subsystem 20 and the plurality of RHs 30(1)-30(N) form a distributed multi-user-MIMO system when communicating with multiple client devices simultaneously.

Figure 2:
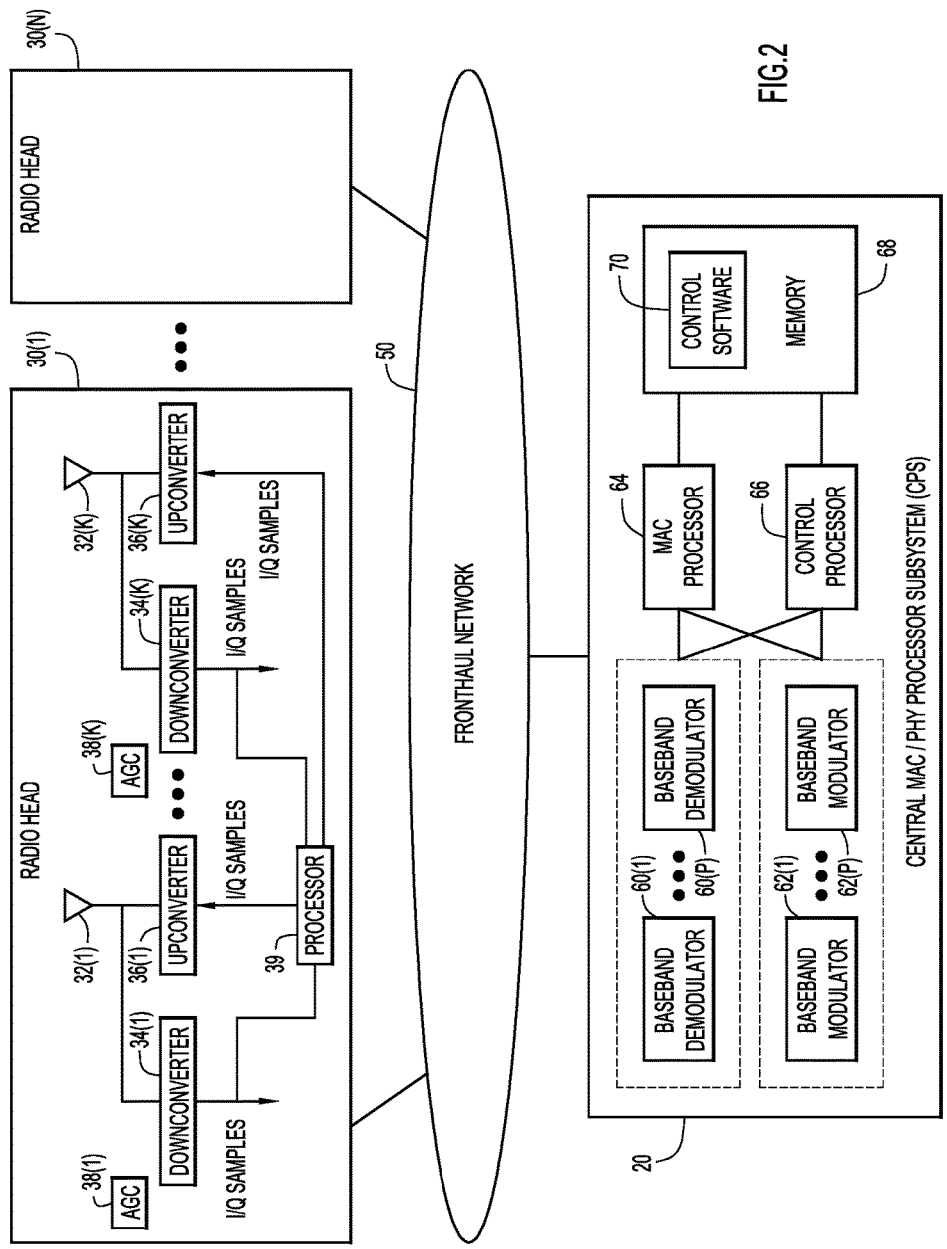
FIG. 2 is a more detailed block diagram of the system shown in FIG. 1, according to an example embodiment.

Reference is now made to FIG. 2. FIG. 2 shows the RHs 30 and the central MAC/PHY processor subsystem 20 in more detail, according to an example embodiment. For generality, a plurality of RHs 30(1)-30(N) is shown connected to the central MAC/PHY processor subsystem 20 by a fronthaul network 50.

Each RH includes a plurality of antennas 32(1)-32(K), a corresponding plurality of downconverters 34(1)-34(K), a corresponding plurality of upconverters 36(1)-36(K) and a corresponding plurality of AGC blocks 38(1)-38(K) (or one AGC block shared across all of the antenna paths). In another arrangement, a given RH may include only one antenna. Antennas 32(1)-32(K) are in close proximity to each other, and may coexist in a single mechanical enclosure, for example. Each downconverter 34(1)-34(K) generates downconverted I/Q samples (i.e., a receive waveform) of a receive signal, such as a PDU, received at its associated antenna, which are sent over the fronthaul network 50 to the central MAC/PHY processor subsystem 20. Each upconverter 36(1)-36(K) upconverts I/Q samples of a transmit waveform representative of a PDU (received from the central MAC/PHY processor subsystem 20) for transmission via its associated antenna. An analog-to-digital converter (ADC) may be included in or associated with each downconverter 34(1)-34(K), though not shown in FIG. 2 for simplicity. Likewise, a digital-to-analog converter (DAC) may be included in or associated with each upconverter 36(1)-36(K).

In addition, each RH may include a processor 39 that is coupled to each of the downconverters 34(1)-34(K) to perform signal processing on the downconverted samples of the receive waveforms produced by the downconverters. Each RH is capable of performing common actions such as start-of-packet (SOP) detection, automatic gain control (AGC), and the like. That is, each RH, by way of operations performed by the processor 39 in each RH, may perform SOP detection and the AGC block(s) in each RH may performed AGC operations, or these operations are performed by the central MAC/PHY processor subsystem 20. Processor 39 is also coupled to each of the upconverters 36(1)-36(K) to perform signal processing on the upconverted samples of transmit PDUs produced by the upconverters. The processor 39 may be a digital signal processor, an application specific integrated circuit (ASIC) including digital logic gates, a programmable digital logic, or a microprocessor or microcontroller that executes instructions stored in memory to carry out various signal processing operations.

The central MAC/PHY processor subsystem 20 includes a bank of baseband demodulators 60(1)-60(P), a bank of baseband modulators 62(1)-62(P), a MAC processor 64, a control processor 66, and memory 68. The MAC processor 64 and control processor 66 are each connected to the bank of baseband demodulators 60(1)-60(P) and to the bank of baseband modulators 62(1)-62(P). The baseband demodulators 60(1)-60(P) perform baseband demodulation processing on the downconverted I/Q samples of receive waveforms received from each antenna path of each RH. The baseband modulators 62(1)-62(P) perform baseband modulation processing to generate I/Q samples of transmit waveforms to be supplied to each upconverter of each antenna path of each RH. The MAC processor 64 performs media access control processing. In addition, central MAC/PHY processor subsystem 20 may perform digital, adaptive transmit beam forming and receive beam forming, as described below. The control processor 66 performs a variety of other functions, in combination with MAC processor 64, including the collision detection and avoidance processing described in greater detail below, by executing instructions associated with the control software 70 stored in memory 68. In one form, one or more of the baseband demodulators, baseband modulators, MAC processor 64 and control processor 66 may be implemented in one or more ASICs, digital signal processors, programmable digital logic gates, etc.

The memory 68 may include read only memory (ROM), random access memory (RAM), magnetic disk storage media devices, optical storage media devices, flash memory devices, electrical, optical, or other physical/tangible memory storage devices. Thus, in general, the memory 68 may comprise one or more tangible (non-transitory) computer readable storage media (e.g., a memory device) encoded with software comprising computer executable instructions and when the software is executed (by the processor 65) it is operable to perform the operations described herein.

Figure 3:
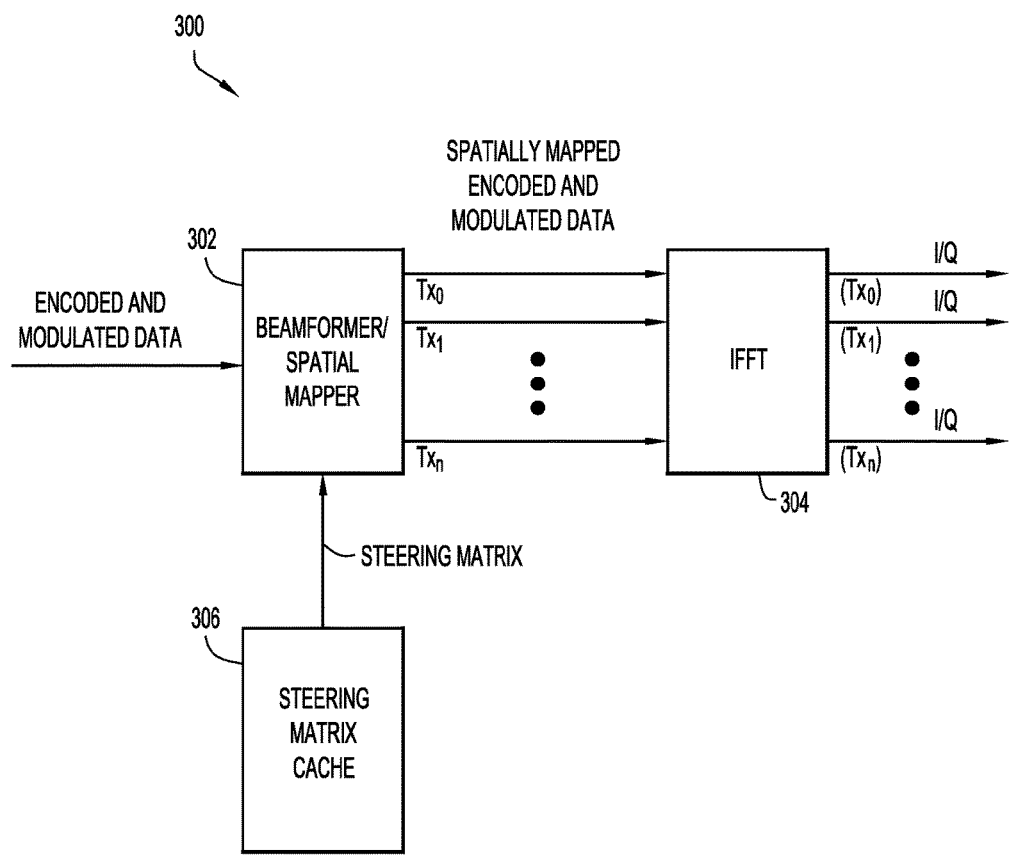
FIG. 3 is a block diagram of signal processing blocks of a central processor subsystem of the system of FIG. 1 configured to implement adaptive digital beam forming, according to an example embodiment.

With reference to FIG. 3, there is a block diagram of example signal processing modules 300 of central MAC/PHY processor subsystem 20 configured to implement adaptive, digital transmit beam forming. Central MAC/PHY processor subsystem 20 includes other signal processing modules (not shown in FIG. 3) that generate encoded, modulated data and then deliver that data to signal processing modules 300. Signal processing modules 300 includes a beam former/spatial mapper 302, an inverse Fast Fourier transform (IFFT) module 304, and a steering matrix cache 306.

In operation, steering matrix cache 306 generates a steering matrix corresponding to a desired transmit beam, and provides the steering matrix to beam former/spatial mapper 302. An example of a desired transmit beam includes a beam having a signal null pointing to a predetermined set of antennas. When it is desired to generate/form the desired transmit beam, steering matrix cache 306 may derive, or be provided with, beam forming information needed to generate the steering matrix corresponding to the desired beam. Beam former/spatial mapper 302 matrix multiplies the steering matrix with the encoded and modulated data, to produce spatially mapped data TX0-TXn. Mapper 302 performs the matrix multiplication on a per-subcarrier basis and maps the encoded and modulated data to transmit paths that progress through the RHs. Mapper 302 provides spatially mapped data TX0-TXn to IFFT module 304. IFFT module 304 performs an IFFT on spatially mapped data TX0-TXn to produce I/Q samples (transmit waveforms) for the transmit paths. Beam former/spatial mapper 302, IFFT module 304, and steering matrix cache 306 may each be implemented in accordance with any known or hereafter developed techniques, as would be appreciated by one having ordinary skill in the relevant arts. In another embodiment, signal processing modules may implement adaptive digital beam forming on receive waveforms to spatially filter energy arriving at the RH antennas from predetermined spatial signatures.

Figure 4:
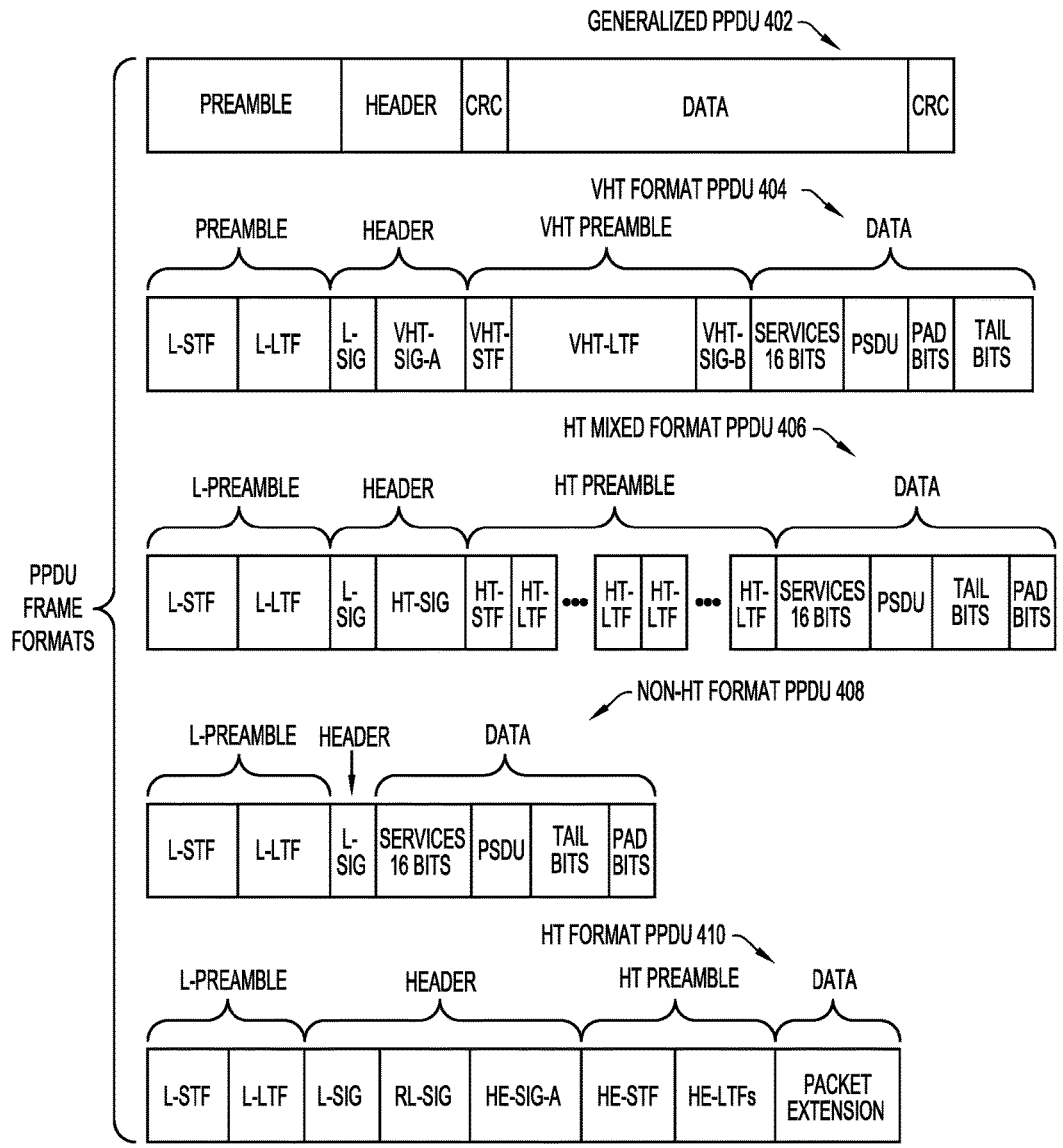
FIG. 4 is an illustration of frame formats for physical layer convergence procedure (PLCP) protocol data units (PPDUs) transmitted and received in the system of FIG. 1, according to an example embodiment.

With reference to FIG. 4, there is an illustration of an example frame format for a generalized PPDU 402 that may be transmitted and received by RHs 30/and by the client devices. FIG. 4 also shows specific frame formats for a Very High Throughput (VHT) PPDU 404, a High Throughput (HT)-mixed format PPDU 406, a non-HT format PPDU 408, and a High Efficiency (HE) format PPDU 410 that may each be transmitted and received in accordance with one or more of the IEEE 802.11 standards. The frame formats shown in FIG. 4 are exemplary only, and it is understood that many other frame formats may be used. Generalized PPDU 402 includes a sequence of generalized fields including, but not limited to, (i) one or more training fields or preambles to which a decoder synchronizes, (ii) a header to convey transmission parameters, such as rate, length, and parity information that enables decoding/demodulation of subsequent data carried in the PPDU, and (iii) the subsequent data, including frame data. One or both of the header and the data of PPDU 402 may terminate with a corresponding frame check sum (FCS), such as a cyclic redundancy code (CRC), validating the contents of the corresponding fields, and the PPDU in general.

The frame formats for specific PPDUs 404-410 conform generally to that of PPDU 402. For example, VHT PPDU 404 includes: a legacy (L) preamble including a short training field (L-STF) followed by a long training field (L-LTF); a header including L-SIG and VHT-SIG-A fields to convey transmission parameters; a VHT preamble; and data. HT PPDU 406 includes an L preamble, a header including L-SIG and HT-SIG fields to convey transmission parameters, an HT preamble, and data. Non-HT PPDU 408 includes an L preamble, a header including an L-SIG field to convey transmission parameters, and data. HE PPDU 410 includes an L preamble, a header including L-SIG, RL-SIG, and HE-SIG-A fields to convey transmission parameters, an HE preamble, and data.

Returning to FIG. 1, in normal operation of wireless network system 10, wireless clients 40(1)-40(3) and central MAC/PHY processor subsystem 20 contend for access to communication channels. To contend for access during a given time period, wireless clients 40(1)-40(3) and central MAC/PHY processor subsystem 20 may simultaneously transmit their respective signals, e.g., PPDUs, resulting in collisions between transmissions. Accordingly, embodiments presented herein employ distributed RHs 30 operating under control of central MAC/PHY processor subsystem 20 to detect such collisions and rapidly implement collision mitigation strategies while the collision is occurring. At a high-level, central MAC/PHY processor subsystem 20 sends a transmit waveform representative of a PPDU to a first RH for transmission, and commands a second RH to listen for that transmission. While sending the transmit waveform, central MAC/PHY processor subsystem 20 monitors the response of the second RH (i.e., monitors the receive waveform from the second RH) to detect a collision, if any, between the transmission from the first RH (as seen at the second RH) and other transmissions, which may arise from concurrent transmission from client device. When a collision is detected, central MAC/PHY processor subsystem 20 modifies the sending of the transmit waveform to reduce system impact from the collision. In this way, central MAC/PHY processor subsystem 20 employs the first and second RHs to implement a transmit-receive loop-back or transmit-to-self operation for detecting and mitigating collisions concurrent with the loop-back operation.

Figure 5:
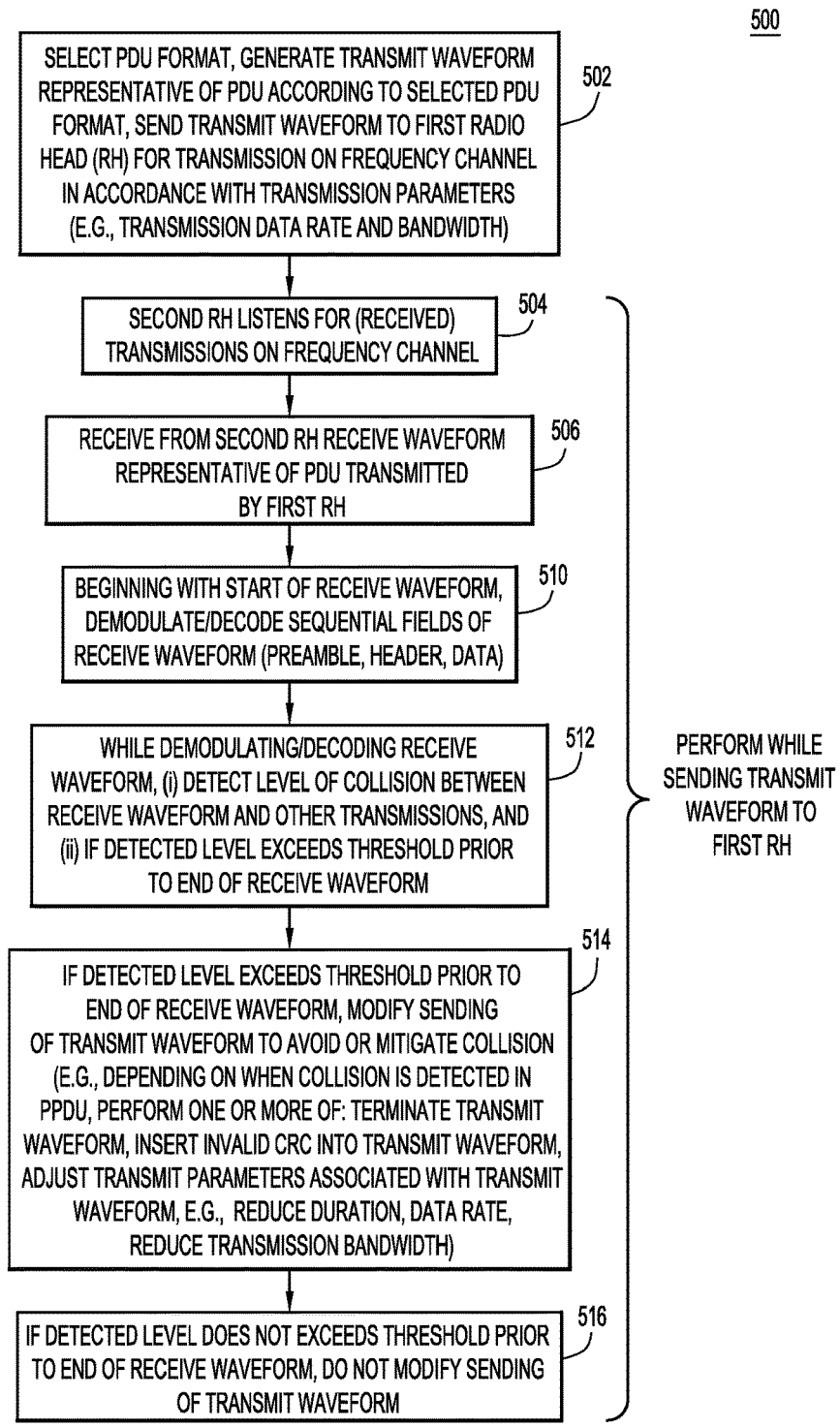
FIG. 5 is a flowchart of a method of detecting and avoiding collisions using the distributed radio heads in the system of FIG. 1, performed by the central processor subsystem, according to an example embodiment.

With reference to FIG. 5, there is a flowchart of a method 500 of detecting and avoiding collisions using RHs 30 performed by central MAC/PHY processor subsystem 20. In the ensuing description, central MAC/PHY processor subsystem 20 is referred to as "central processor subsystem" (CPS) 20. While method 500 refers to exchanging PPDUs, more generally, other types of PDUs may be exchanged.

At 502, CPS 20 selects a PPDU format and generates a stream of baseband I/Q samples of a transmit waveform representative of a PPDU to be transmitted from the associated RH, in accordance with transmission parameters of the selected PDU format, including, but not limited, transmit data rate, encoding rate, PDU duration, bandwidth, and so on. The transmit PPDU may be a PPDU formatted similarly to any of the PPDU formats depicted in FIG. 4, for example. The PPDU carries layer 2 (L2) fields including MAC addresses and, in some cases, may carry layer 3 (L3) fields such as IP addresses. In an example, the transmit waveform may represent a PPDU including a unicast frame addressed to a single client. In another example, the transmit waveform may represent a PPDU including a multicast frame addressed to a group of clients, i.e., the frame includes a group address as a receive address. CPS 20 sends (i.e., transmits) the transmit waveform (e.g., the baseband I/Q samples of the transmit waveform) at a selected data rate to a first RH (e.g., RH(1)) among RHs 30 to be transmitted wirelessly from the antennas of the first RH on a selected frequency channel (and selected bandwidth) commanded by the CPS. The antennas of the first RH begin transmitting the transmit waveform.

Unless specified otherwise, each of operations 504-516 described below is performed while CPS 20 is sending the transmit waveform to the first RH.

At 504, concurrent with operation 502, a second RH (e.g., RH(3)) among RHs 30, tuned to receive signals/listen on the same frequency channel on which the first CPS is transmitting the transmit PPDU in operation 502, begins to receive at its antennas signals. The receive signals may include the PPDU transmitted from the first RH, noise, and possibly interfering transmission, such as receive PPDUs transmitted by other sources. The second RH downconverts the received signals, including the received PPDU transmitted by the first RH, at the antennas of the second RH, to produce downconverted I/Q samples of a receive waveform representative of the received signals at the antennas. The second RH provides the downconverted I/Q samples of the receive waveform to CPS 20.

At 506, CPS 20 begins to receive from the second RH the downconverted I/Q samples of the receive waveform representative of the transmitted PPDU as well as noise and other possibly interfering transmissions. CPS 20 may also receive from the second RH an SOP indicating the arrival of the receive frame.

At 510, beginning with a start of the receive waveform, CPS 20 begins sequentially demodulating and decoding the fields of the receive waveform, e.g., the preamble, the header, and the data, in accordance with the selected frame format. Operation 510 may be keyed to receipt of the SOP from the second RH, although this is optional.

At 512, while performing the demodulation and the decoding of the receive waveform, CPS 20 also (i) detects a level of collision, if any, between the receive waveform and any other transmission(s) on the frequency channel, and (ii) whether the detected level of collision exceeds one or more predetermined collision thresholds (referred to simply as "thresholds") prior to an end of the receive waveform, i.e., whether a collision is detected. The end of the receive waveform is known from the demodulation and decoding of the receive waveform. In an example, CPS 20 may determine the level of collision as a signal-to-interference ratio (SIR) associated with the receive waveform, and compare the SIR to one or more predetermined SIRs representative of the thresholds. In other examples, CPS 20 may determine the level of collision based on a frequency offset estimate or a time offset estimate derived from the received signal. In these examples, the level of collision may represent a deviation/variance from an expected frequency offset estimate or a deviation from an expected time offset estimate, and the collision threshold may correspond to a deviation/variance threshold. The deviation/variance threshold may be based on a calibration of a communication channel between the first radio head and the second radio head. Any presently known or hereafter developed technique for determining SIR, determining frequency offset, or determining time offset may be used in determining the level collision, as would be appreciate by one having ordinary skill in the relevant arts having read the present description.

At 514, if/when it is determined that the detected level of collision exceeds one or more of the thresholds prior to the end of the receive waveform (representative of the received PPDU) (i.e., the collision is detected), CPS 20 modifies the sending of the transmit waveform to either mitigate or avoid the collision. In addition, CPS 20 may determine where/when in the decoded sequence of fields the detected level of collision exceeded the one or more collision thresholds, and modify the sending of the transmit waveform based on where/when in the sequence the collision is detected.

CPS 20 may modify the sending of the transmit waveform in a variety of ways. For example, CPS 20 may perform any of the following operations:
  a. Terminate the sending of the transmit waveform prior to the end of the transmit waveform as representing the PPDU.
  b. Rather than terminate the sending, reduce the selected duration, data rate, or bandwidth, prior to encoding the appropriate PLCP header symbols, to a reduced duration, data rate, or bandwidth at which a remainder of the transmit waveform yet to be transmitted is to be transmitted to the first RH, and then by the RH as the PPDU.
  c. Rather than terminate the sending, insert an invalid CRC (e.g., all "0s" or all "1s") into a known CRC field in a remainder of the transmit waveform that is yet to be transmitted by the first RH, and then send the remainder of the transmit waveform that includes the invalid CRC to the first RH to be transmitted by the first RH as the PPDU. In an example, the invalid CRC may be inserted into a CRC field at an end of the header or an end of the data in the transmit waveform.
  d. In an embodiment in which CPS 20 implements a frame exchange sequence via a sequence of PPDUs, i.e., each of the PPDUs in the sequence conveys a respective one of the frames in the frame exchange sequence, CPS may modify the frame exchange sequence to reduce or avoid the collision. For example, in the context of RTS/CTS frame exchange sequence, or simply a CTS only frame exchange, CPS 20 may not send a subsequent data frame if the CPS detects a collision on the CTS frame, or may send the subsequent data frame, but with a reduced data rate that would have been used in the absence of the detected collision.

The operation to modify the sending of the transmit waveform may be based on where/when in the sequence of fields of the receive waveform the collision is detected. For example, in the case of any of the HT/VHT/HE PPDUs 406/404/410: (i) if CPS 20 detects that the collision has occurred prior to the encoding of a PPDU duration field in the HT-SIG/VHT-SIG-A/HE-SIG-A fields, the CPS may reduce a duration of the PPDU relative to an initially selected/intended duration for the PPDU (and encode the reduced duration into the relevant duration field); (ii) if the CPS detects that the collision has occurred prior to the encoding of a data rate field in the HT-SIG/VHT-SIG-A/HE-SIG-A fields, the CPS may reduce a data rate at which the transmit waveform is transmitted to the first RH compared to an initially selected/intended data rate (and encode the reduce data rate into the relevant data rate field); or (iii) if the CPS detects that the collision has occurred prior to the encoding of the HT-SIG/VHT-SIG-A/HE-SIG-A fields, the CPS may reduce a bandwidth of the frequency channel on which the transmit waveform is wirelessly transmitted by the first RH as the PPDU from an initial bandwidth to a reduced bandwidth. On the other hand, if CPS 20 detects the collision even earlier, e.g., prior to decoding of the L-SIG field, the CPS may both reduce the bandwidth of the frequency channel and also adjust the duration of the transmit waveform from an initial duration to a reduced duration, or a longer duration to offset the reduced number of data bits carried at a reduced data rate. CPS 20 takes action to reduce the duration, data rate, and/or bandwidth at appropriate symbol boundaries in the PPDU.

At 516, if it is determined that the detected level of collision does not exceed the one or more of the collision thresholds prior to the end of the receive waveform, CPS 20 does not modify the sending of the transmit waveform prior to the end of the transmit waveform.

Figure 6:
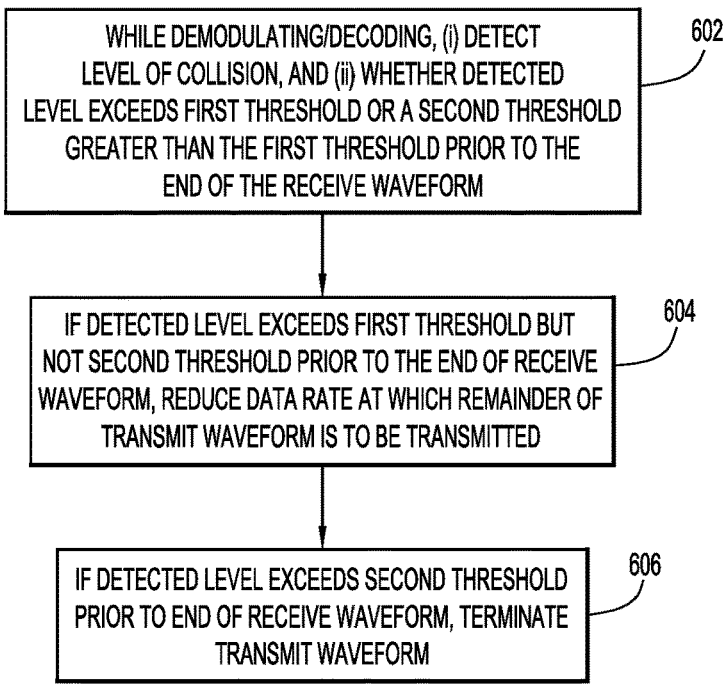
FIG. 6 is a flowchart of operations expanding on operations performed in the method of FIG. 5, in which multiple predetermined collision thresholds are used, according to an example embodiment.

With reference to FIG. 6, there are shown operations 600 expanding on operations 512-514 in an embodiment using multiple predetermined collision thresholds (i.e., "thresholds").

At 602, CPS 20 (i) detects the level of collision, and (ii) whether the detected level of collision exceeds a first threshold or a second threshold that is greater than the first threshold prior to the end of the receive waveform.

At 604, if the detected level of collision exceeds the first threshold but not the second threshold prior to the end of the receive waveform, CPS 20 modifies the sending of the transmit waveform according to a first collision avoidance strategy. For example, CPS 20 reduces a data rate at which a remainder of the transmit waveform yet to be transmitted is to be transmitted by the first RH, and then transmits the remainder of the transmit waveform at the reduced data rate.

At 606, if the detected level of collision exceeds the second threshold prior to the end of the receive waveform, CPS 20 modifies the sending of the transmit waveform according to a second collision avoidance strategy. For example, CPS 20 terminates the transmit waveform, i.e., terminates sending the transmit waveform, prior to the end of the transmit waveform.

Figure 7:
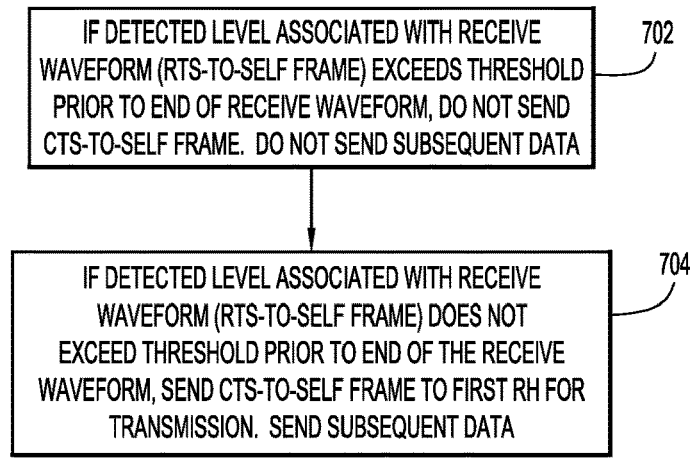
FIG. 7 is a flowchart of operations expanding on operations performed in the method of FIG. 5, in which a request-to-send (RTS)/clear-to-send (CTS) protocol is used, according to an example embodiment.

With reference to FIG. 7, there is are shown operations 700 expanding on operations 514 and 516 of method 500 in an embodiment in which CPS 20 is configured to implement an RTS/CTS protocol in accordance with a wireless protocol, such as 802.11, for example. For the embodiment of FIG. 7, it is assumed that PPDUs carrying RTS or CTS frames may be exchanged between RHs. For example, in operation 502, CPS 20 sends the transmit waveform representative of the PPDU such that the PPDU is formatted to carry/include a RTS-to-self frame formatted as an RTS frame in accordance with the wireless protocol, which RTS-to-self frame the CPS expects to receive via the second RH.

At 702 (corresponding to operation 514), if it is determined that the detected level of collision exceeds the one or more thresholds prior to the end of the receive waveform (i.e., the end of the receive waveform representative of the PPDU including the RTS-to-self frame transmitted from the first RH), CPS 20 does not send to the second RH a follow-up transmit waveform representative of a PPDU formatted to include a CTS-to-self frame in accordance with the wireless RTS/CTS protocol. Moreover, CPS 20 does not follow the RTS-to-self frame with subsequent data.

At 704 (corresponding to operation 516), if it is determined that the detected level of collision does not exceed the one or more thresholds at any time prior to the end of the receive waveform (i.e., the end of the receive waveform representative of the PPDU including the RTS-to-self frame), CPS 20 sends the above-mentioned follow-up transmit waveform formatted as the PPDU carrying the CTS-to-self frame to the second RH to be transmitted wirelessly by the second RH on the frequency channel. As a result, the second RH wirelessly transmits the PPDU carrying the CTS-to-self frame on the frequency channel, which is received at the antennas of the first RH. The first RH downconverts the received PPDU carrying the CTS frame at the first RH antennas to a receive waveform, and provides the receive waveform to CPS 20. CPS 20 demodulates/decodes the receive waveform. After CPS 20 has successfully processed the CTS-to-self frame represented in the receive waveform), CPS 20 sends to one or more of RHs 30 transmit waveforms carrying data to be transmitted wirelessly.

With reference to FIG. 8, there are shown operations 800 performed by CPS 20 expanding on operations 502, 514, and 516 for an embodiment in which CPS 20 is configured to implement a modified wireless RTS/CTS protocol with respect to the RTS/CTS protocol of FIG. 7.

At 802 (corresponding to operation 502), CPS 20 sends the transmit waveform to the first RH so as to include a CTS-to-self frame (in lieu of the RTS-to-self frame), which the CPS expects to receive via the second RH.

At 804 (corresponding to operation 514), if it is determined that the detected level of collision exceeds the one or more thresholds at any time prior to the end of the receive waveform (i.e., the CTS-to-self frame conveyed by the receive waveform), CPS 20 declares the frequency channel not clear for data transmission and does not send subsequent data to any of RHs 30 for transmission.

At 806 (corresponding to operation 516), if it is determined that the detected level of collision does not exceed the one or more thresholds at any time prior to the end of the receive waveform (i.e., the CTS-to-self frame conveyed by the receive waveform), CPS 20 declares the frequency channel clear for data transmission and sends subsequent data to any of RHs 30 for transmission.

With reference to FIG. 9, there is a flowchart of an example method 900 combining the operations of method 500 with digital beamforming.

At 902, CPS 20 performs the operations of method 500 while beam forming signal processing modules 300 perform digital beam forming on the transmit waveform so that the one or more antennas of the first transceiver form a signal null directed to the antennas of the second transceiver. This enables CPS 20 to detect the other transmissions (which may cause collisions) at lower levels than in the absence of the signal null.

In summary, in one form, a method is provided comprising: at a central processor subsystem configured to control multiple transceivers separated from each other in a coverage region of a wireless network, each transceiver configured to transmit protocol data units (PDUs) wirelessly from one or more antennas of that transceiver and convert wirelessly received signals at the one or more antennas to receive waveforms: sending a transmit waveform representative of a PDU, the PDU including a frame addressed to one or more wireless client devices, through a first transceiver of the multiple transceivers to be transmitted wirelessly by the first transceiver on a frequency channel; receiving from a second transceiver of the multiple transceivers tuned to receive on the frequency channel a receive waveform representative of the PDU transmitted by the first transceiver that is wirelessly received at the second transceiver; and while sending the transmit waveform to the first transceiver: beginning with a start of the receive waveform, detecting a level of collision between the receive waveform and another transmission on the frequency channel; and if the level of collision exceeds a threshold prior to an end of the receive waveform, modifying the sending of the transmit waveform or modifying sending of a sequence of transmit waveforms representative of PDUs to reduce or avoid the collision.

In another form, an apparatus is provided comprising: a central processor subsystem configured to control multiple transceivers separated from each other in a coverage region of a wireless network, each transceiver configured to transmit protocol data units (PDUs) wirelessly from one or more antennas of that transceiver and convert wirelessly received signals at the one or more antennas to receive waveforms, the central processor subsystem configured to: send a transmit waveform representative of a PDU, the PDU including a frame addressed to one or more wireless client devices, through a first transceiver of the multiple transceivers to be transmitted wirelessly by the first transceiver on a frequency channel; receive from a second transceiver of the multiple transceivers tuned to receive on the frequency channel a receive waveform representative of the PDU transmitted by the first transceiver that is wirelessly received at the second transceiver; and while sending the transmit waveform to the first transceiver: beginning with a start of the receive waveform, detect a level of collision between the receive waveform and another transmission on the frequency channel; and if the level of collision exceeds a threshold prior to an end of the receive waveform, modify the sending of the transmit waveform or modify sending a sequence of transmit waveforms representative of PDUs to reduce or avoid the collision.

In yet another form, a non-transitory computer readable storage media is encoded with instructions that, when executed by a processor of a central processor subsystem configured to control multiple transceivers separated from each other in a coverage region of a wireless network, each transceiver configured to transmit protocol data units (PDUs) wirelessly from one or more antennas of that transceiver and convert wirelessly received signals at the one or more antennas to receive waveforms, cause the processor to perform: sending a transmit waveform representative of a PDU, the PDU including a frame addressed to one or more wireless client devices, through a first transceiver of the multiple transceivers to be transmitted wirelessly by the first transceiver on a frequency channel; receiving from a second transceiver of the multiple transceivers tuned to receive on the frequency channel a receive waveform representative of the PDU transmitted by the first transceiver that is wirelessly received at the second transceiver; and while sending the transmit waveform to the first transceiver: beginning with a start of the receive waveform, detecting a level of collision between the receive waveform and another transmission on the frequency channel; and if the level of collision exceeds a threshold prior to an end of the receive waveform, modifying the sending of the transmit waveform or modifying sending of a sequence of transmit waveforms representative of PDUs to reduce or avoid the collision.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    at a central processor subsystem configured to control multiple transceivers separated from each other in a coverage region of a wireless network, each transceiver configured to transmit protocol data units (PDUs) wirelessly from one or more antennas of that transceiver and convert wirelessly received signals at the one or more antennas to receive waveforms:
        sending a transmit waveform representative of a PDU, the PDU including a frame addressed to one or more wireless client devices, through a first transceiver of the multiple transceivers to be transmitted wirelessly by the first transceiver on a frequency channel;
        receiving from a second transceiver of the multiple transceivers tuned to receive on the frequency channel a receive waveform representative of the PDU transmitted by the first transceiver that is wirelessly received at the second transceiver; and
        while sending the transmit waveform to the first transceiver:
            beginning with a start of the receive waveform, detecting a level of collision between the receive waveform and another transmission on the frequency channel; and
            when the level of collision exceeds a threshold prior to an end of the receive waveform, modifying the sending of the transmit waveform to reduce or avoid the collision.

2. The method of claim 1, wherein the detecting the level of collision includes determining one of a signal-to-interference ratio (SIR), a frequency offset estimate, or a time offset estimate associated with the receive waveform as the level of collision, and wherein the threshold represents one of an SIR threshold, a variance of the frequency offset estimate from an expected frequency offset estimate, or a variance of the time offset from a time offset estimate, respectively.

3. The method of claim 1, further comprising, while sending the transmit waveform through the first transceiver:
    beginning with the start of the receive waveform, decoding the receive waveform,
    wherein when the detected level of collision exceeds the threshold prior to decoding an entirety of the receive waveform, performing the modifying.

4. The method of claim 1, further comprising:
    when the detected level of collision exceeds a first threshold prior to the end of the receive waveform, reducing a data rate at which a remainder of the transmit waveform yet to be transmitted is to be transmitted by the first transceiver; and
    when the detected level of the collision exceeds a second threshold greater than the first threshold prior to the end of the receive waveform, terminating the sending of the transmit waveform prior to the end of the transmit waveform.

5. The method of claim 1, wherein the modifying the sending the transmit waveform includes:
    inserting an invalid cyclic redundancy check (CRC) into a remainder of the transmit waveform representative of the PDU that is being transmitted by the first transceiver; and
    sending the remainder of the transmit waveform that includes the invalid CRC through the first transceiver to be transmitted by the first transceiver.

6. The method of claim 1, further comprising:
    performing digital beam forming on the transmit waveform so that the one or more antennas of the first transceiver form a signal null directed to one or more antennas of the second transceiver.

7. The method of claim 1, wherein the PDU includes a training field, a header defining transmission parameters used for decoding the PDU, and a payload including the frame, wherein the method further comprises, while sending the transmit waveform through the first transceiver:
    decoding the receive waveform beginning with the start of the waveform,
    wherein when the detected level of collision exceeds the threshold prior to an indication in the header of a duration of the PDU, the modifying includes changing the duration of the PDU from an initial intended duration to a different duration.

8. The method of claim 1, wherein the PDU includes a training field, a header defining transmission parameters used for decoding the PDU, and a payload including the frame, wherein the method further comprises, while sending the transmit waveform through the first transceiver:
    decoding the receive waveform beginning with the start of the waveform,
    wherein when the detected level of collision exceeds the threshold prior to an indication in the header of a data rate, the modifying includes reducing the data rate from an initial intended data rate to a reduced data rate.

9. The method of claim 1, wherein, as part of a wireless request-to-send (RTS)/clear-to-send (CTS) protocol, the sending includes sending the transmit waveform representative of the PDU such that the frame of the PDU includes a RTS-to-self frame, and the method further comprises:
    when the level of collision does not exceed the threshold prior to the end of the receive waveform, sending a second transmit waveform representative of a second PDU that includes a CTS-to-self frame through the first transceiver to be transmitted wirelessly by the first transceiver; and
    when the level of collision is detected above the threshold and at the time prior to the end of the receive waveform, not sending the second transmit waveform representative of the second PDU that includes the CTS-to-self frame.

10. The method of claim 1, further comprising, as part of a modified wireless request-to-send (RTS)/clear-to-send (CTS) protocol:
    bypassing sending a transmit waveform representative of a PDU including an RTS frame to the first transceiver for transmission by the first transceiver,
    wherein the sending includes sending the transmit waveform representative of the PDU such that the PDU includes a CTS-to-self frame in place of the RTS frame in order to detect collisions.

11. The method of claim 1, wherein the PDU is a physical layer convergence procedure (PLCP) PDU (PPDU) formatted as a Very High Throughput (VHT) PPDU, a High Throughput (HT)-mixed format PPDU, a non-HT format PPDU, or a High Efficiency (HE) format PPDU.

12. An apparatus comprising:
a central processor subsystem configured to control multiple transceivers separated from each other in a coverage region of a wireless network, each transceiver configured to transmit protocol data units (PDUs) wirelessly from one or more antennas of that transceiver and convert wirelessly received signals at the one or more antennas to receive waveforms, the central processor subsystem configured to:
   send a transmit waveform representative of a PDU, the PDU including a frame addressed to one or more wireless client devices, through a first transceiver of the multiple transceivers to be transmitted wirelessly by the first transceiver on a frequency channel;
   receive from a second transceiver of the multiple transceivers tuned to receive on the frequency channel a receive waveform representative of the PDU transmitted by the first transceiver that is wirelessly received at the second transceiver; and
   while sending the transmit waveform to the first transceiver:
      beginning with a start of the receive waveform, detect a level of collision between the receive waveform and another transmission on the frequency channel; and
      when the level of collision exceeds a threshold prior to an end of the receive waveform, modify the sending of the transmit waveform to reduce or avoid the collision.

13. The apparatus of claim 12, wherein the central processor subsystem is configured to detect the level of collision by determining one of a signal-to-interference ratio (SIR), a frequency offset estimate, or a time offset estimate associated with the receive waveform as the level of collision, and wherein the threshold represents one of an SIR threshold, a variance of the frequency offset estimate from an expected frequency offset estimate, or a variance of the time offset from a time offset estimate, respectively.

14. The apparatus of claim 12, wherein the central processor subsystem is further configured to, while sending the transmit waveform through the first transceiver:
   beginning with the start of the receive waveform, decode the receive waveform,
   wherein when the detected level of collision exceeds the threshold prior to decoding an entirety of the receive waveform, perform the modify the sending of the transmit waveform.

15. The method of claim 12, wherein the central processor subsystem is further configured to:
   when the detected level of collision exceeds a first threshold prior to the end of the receive waveform, reduce a data rate at which a remainder of the transmit waveform yet to be transmitted is to be transmitted by the first transceiver; and
   when the detected level of the collision exceeds a second threshold greater than the first threshold prior to the end of the receive waveform, terminate the sending of the transmit waveform prior to the end of the transmit waveform.

16. The apparatus of claim 12, wherein the PDU includes a training field, a header defining transmission parameters used for decoding the PDU, and a payload including the frame, wherein the central processor subsystem is further configured to, while sending the transmit waveform through the first transceiver:
   decode the receive waveform beginning with the start of the waveform,
   wherein when the detected level of collision exceeds the threshold prior to an indication in the header of a duration of the PDU or prior to an indication in the header of a data rate, the central processor subsystem is configured to modify by reducing the duration of the PDU from an initial intended duration to a reduced duration or reducing the data rate from an initial intended data rate to a reduced data rate, respectively.

17. The method of claim 12, wherein the central processor subsystem is further configured to:
   perform digital beam forming on the transmit waveform so that the one or more antennas of the first transceiver form a signal null directed to one or more antennas of the second transceiver.

18. A non-transitory computer readable storage medium encoded with instructions that, when executed by a processor of a central processor subsystem configured to control multiple transceivers separated from each other in a coverage region of a wireless network, each transceiver configured to transmit protocol data units (PDUs) wirelessly from one or more antennas of that transceiver and convert wirelessly received signals at the one or more antennas to receive waveforms, cause the processor to perform:
   sending a transmit waveform representative of a PDU, the PDU including a frame addressed to one or more wireless client devices, through a first transceiver of the multiple transceivers to be transmitted wirelessly by the first transceiver on a frequency channel;
   receiving from a second transceiver of the multiple transceivers tuned to receive on the frequency channel a receive waveform representative of the PDU transmitted by the first transceiver that is wirelessly received at the second transceiver; and
   while sending the transmit waveform to the first transceiver:
      beginning with a start of the receive waveform, detecting a level of collision between the receive waveform and another transmission on the frequency channel; and
      when the level of collision exceeds a threshold prior to an end of the receive waveform, modifying the sending of the transmit waveform to reduce or avoid the collision.

19. The non-transitory computer readable storage medium of claim 18, further comprising instructions to cause the processor to perform, while sending the transmit waveform through the first transceiver:
   beginning with the start of the receive waveform, decoding the receive waveform,
   wherein when the detected level of collision exceeds the threshold prior to decoding an entirety of the receive waveform, performing the modifying.

20. The non-transitory computer readable storage medium of claim 18, further comprising instructions to cause the processor to perform:
   when the detected level of collision exceeds a first threshold prior to the end of the receive waveform, reducing a data rate at which a remainder of the transmit waveform yet to be transmitted is to be transmitted by the first transceiver; and
   when the detected level of the collision exceeds a second threshold greater than the first threshold prior to the end of the receive waveform, terminating the sending of the transmit waveform prior to the end of the transmit waveform.

* * * * *